Oct. 10, 1950          E. F. SHELL          2,525,462
MOTOR REVERSING ARRANGEMENT
Filed Dec. 3, 1949
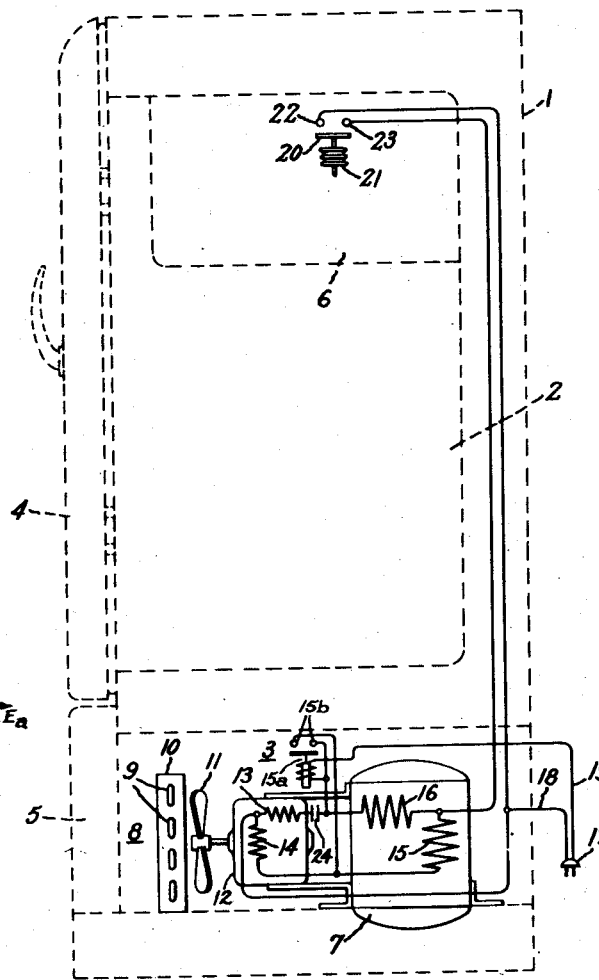
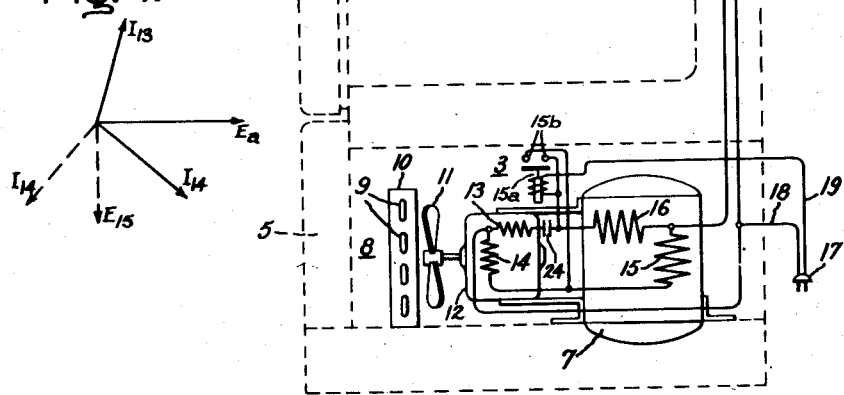
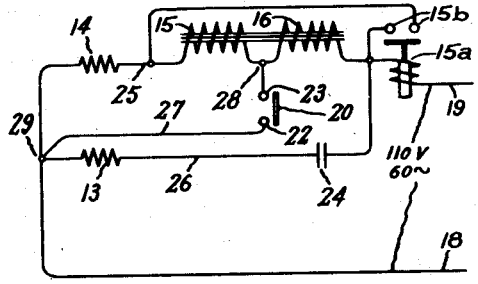
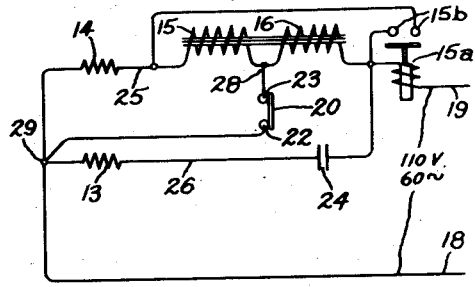
Inventor:
Ernest F. Shell,
by William B. Edwards, Jr.
His Attorney.

Patented Oct. 10, 1950

2,525,462

UNITED STATES PATENT OFFICE 2,525,462

MOTOR REVERSING ARRANGEMENT

Ernest F. Shell, Erie, Pa., assignor to General Electric Company, a corporation of New York Application December 3, 1949, Serial No. 130,930

2 Claims. (Cl. 62—4)

My invention relates to electrical circuits and more particularly to electrical circuits for automatically effecting reversal of a motor.

In connection with the operation of some apparatus it is sometimes desirable to effect automatic reversal of a motor at intervals. For example, the condenser employed with ordinary household refrigerators is sometimes of the forced air cooled type. Such a condenser usually consists of several turns of tubing for conducting refrigerant therethrough and a plurality of relatively closely spaced heat dissipating fins on the tubing. Air is forced over the condenser by a suitable fan to remove heat from the compressed refrigerant. It has been found that, after prolonged operation, dust contained in the air and forced over the fins by the fan collects on the fins in substantial quantities. This requires that the user remove the collected dust from the condenser at intervals, a somewhat difficult task because of the closely spaced fins, or a less efficient operation of refrigerator apparatus is secured because of the insulating effect of the dust and the resulting poorer heat dissipation. By my circuit arrangement I have provided for automatically reversing the fan motor each time the refrigerating unit stops and starts. In this way air is moved over the condenser first in one direction and then in the other so that dust collected during one period is in large measure removed during the succeeding period. By my arrangement, furthermore, this automatic reversal of the fan motor is accomplished with the addition of only a single capacitive reactance element to the conventional circuit already employed in this type of refrigerating apparatus.

It is an object of my invention to provide an improved electrical circuit wherein automatic reversal of a motor is achieved with a minimum number of elements.

It is another object of my invention to provide refrigerating apparatus including a motor driven fan and including an improved circuit arrangement for driving the fan in one direction when the refrigerating unit is operating and in the opposite direction when the refrigerating unit is idle.

Further objects and advantages of my invention will become apparent as the following description proceeds and the features of novelty which characterize my invention will be pointed out with particularity in the claims annexed to and forming part of this specification.

In carrying out the objects of my invention I utilize a conventional circuit employed with refrigerating apparatus where the condenser is cooled by forced air circulation. This circuit is modified by the addition of a single capacitive reactance element and is thereby changed so that the switch for starting and stopping the refrigerating unit also automatically effects a change in the circuit connections whereby the current in one winding of the fan motor leads the current in the other winding when the refrigerating unit is operating and lags when the refrigerating unit is idle, thereby effecting a reversal of the fan.

For a better understanding of my invention reference may be had to the accompanying drawings in which Fig. 1 is a sectional elevation view of a refrigerator including a schematic circuit diagram applied to the refrigerating apparatus; Fig. 2 is a simplified circuit diagram illustrating the circuit elements when the refrigerating unit is idle; and Fig. 3 is a simplified circuit arrangement illustrating the circuit elements when the refrigerating unit is operating; and Fig. 4 is a vector diagram illustrating current and voltage relationships under different conditions.

Referring to Fig. 1 there is shown a refrigerator 1 including the usual food storage compartment 2 and a machinery compartment 3 below the food storage compartment. A door 4 is provided for closing the access opening of the food storage compartment 2, and a cover 5 is provided for closing the front opening of a machinery compartment. An evaporator whose general position is indicated at 6 is disposed in the upper portion of the food storage compartment 2 for cooling that compartment.

The refrigerating apparatus employed is shown in diagrammatic form in the machinery compartment. This apparatus includes a refrigerating unit 7 for compressing the volatile refrigerant used in the refrigerating system and a condenser 8 to which compressed refrigerant is supplied from the refrigerating unit 7 and in which the refrigerant is liquefied before being supplied to the evaporator 6. The condenser 8 is of the conventional finned type. It includes a plurality of passes of tubing 9 and a plurality of relatively closely spaced fins which are secured to the tubing 9 in heat exchange relationship for dissipating heat from the refrigerant passing through the tubing. One such fin is indicated at 10 in the end view of the condenser in Fig. 1. In order to facilitate the cooling of the refrigerant in the condenser 8 a fan 11 is provided for circulating air over the condenser. This fan is driven by an alternating current polyphase induction motor 12. The refrigerating unit 7 includes a compressor driven by an electric motor, the motor and compressor being hermetically sealed within a case.

For clarity in following the description the windings of the fan motor and of the refrigerating unit motor have been superimposed schematically in this figure. The fan motor includes two windings 13 and 14 one of which leads or lags the other electrically so as to effect rotation of the motor. The refrigerating unit motor is a single phase motor including a split phase starting winding 15 and a running winding 16 both of which are arranged on a common magnetic core. Power is supplied to the apparatus in the machinery compartment from any suitable source through a plug 17 and lines 18, 19. In order to close the circuit of the starting winding 15 of the refrigerating unit motor during the starting operation and to interrupt this circuit after the motor has reached a substantial speed, a relay 15a is provided. This relay is adapted to close the circuit through the starting winding at the contacts 15b whenever the current exceeds a predetermined amount, as during starting, and the relay drops out to interrupt the circuit after the current therethrough has decreased to a predetermined amount.

The starting and stopping of the refrigerating unit 7 is controlled in a conventional manner by a switch 20. This switch is moved by a bellows 21 in response to the temperature of the evaporator 6 to open and close a circuit at the contacts 22, 23 for stopping and starting the refrigerating unit motor. Thus, when the temperature of the evaporator reaches a predetermined minimum the bellows 21 contracts to interrupt the circuit at the contacts 22, 23 and to stop the motor of the refrigerating unit 7. Conversely, when the evaporator temperature reaches a predetermined maximum the bellows expands to close the circuit at the contacts 22, 23 and start the motor of the refrigerating unit 7.

To the conventional circuit arrangement described above I have added a reactance element which in the embodiment illustrated comprises a capacitor 24. This capacitor is connected in the circuit in series with the winding 13 of the fan motor. The addition of the capacitor 24 to the circuit allows the operation of the switch 20 which starts and stops the refrigerating unit motor to effect simultaneously a reversal of the direction of rotation of the polyphase fan motor 12. With the circuit arrangement employed the addition of the capacitor 24 causes the current through one winding of the fan motor to lead the current through the other winding in one position of the switch 20 and to lag the current through the other winding in the other position of the switch 20. The manner in which the circuit arrangement accomplishes this result is described in detail in the following paragraphs.

In order to clarify the relationship of the various elements of the circuit arrangement the schematic diagrams shown in Figs. 2 and 3 are included. Referring to these figures it can be seen that the overall circuit consists basically of two parallel circuits 25 and 26 connected across a single source of power supplied through the lines 18 and 19. The circuit 25 includes in series the two windings 15 and 16 of the refrigerating unit motor and the winding 14 of the fan motor. The other parallel circuit 26 includes the other winding 13 of the fan motor and the capacitor 24 connected in series relationship. The switch 20 is connected in a third circuit 27 extending from a point 28 between the windings 15 and 16 of the refrigerating unit motor and a point 29 between the windings 13 and 14 of the fan motor.

The direction of rotation of the fan motor 12 depends on whether the current through the winding 13 is leading or lagging the current through the winding 14. This factor is utilized in my arrangement to effect reversal of rotation of this motor. Thus, referring to the condition of the circuit shown in Fig. 2 wherein the switch 20 is in its open position and the refrigerating unit motor 7 is therefore stopped, it can be seen that power is supplied to the winding 13 through a circuit 26 which includes the capacitor 24 in series with the winding 13. The winding 14 of the fan motor, on the other hand, is supplied through a circuit 25 which includes the windings 15 and 16 in series. It can be seen, therefore, that the current through winding 13 will lead the applied voltage and the current through winding 14 will lag the applied voltage. Hence, the addition of the capacitor 24 causes the current through the winding 13 to lead that through the winding 14 and causes a rotation of the fan motor in one direction.

The voltage and current relationships under these conditions are illustrated by solid lines in the vector diagram in Fig. 4. The applied voltage from the power source is designated by $E_a$, the current through winding 13 by $I_{13}$ and the current through winding 14 by $I_{14}$. The current $I_{13}$ leads current $I_{14}$ by some angle between 90° and 180° and the fan motor rotates in a particular direction.

When the switch 20 is closed, and hence when the motor of the refrigerating unit 7 is operating, the circuit relationship is as shown schematically in Fig. 3. The relay 15a is shown in the open position which it occupies during normal running conditions of the refrigerating unit motor after starting of the refrigerating unit motor has been accomplished. Under these circumstances the winding 13 is still included in the circuit 26 which includes the series capacitor 24. However, the closing of the switch 20 and the resultant establishment of a short circuit between the points 28 and 29 causes the winding 14 of the fan motor to be included in a closed series circuit with the winding 15 of the refrigerating unit motor. A voltage is induced in the winding 15 by the flux resulting from current flow in the winding 16 and this voltage is 90° out of phase with the voltage in the winding 16 and correspondingly 90° out of phase with the voltage of the power source which is applied both to the winding 16 and the circuit 26.

The altered voltage and current relationships under the conditions illustrated in Fig. 3 are shown by dotted lines in Fig. 4. Referring to Fig. 4, the applied voltage from the power source is again designated by $E_a$. The voltage induced in winding 15 is designated by $E_{15}$, and voltage $E_{15}$ lags $E_a$ by 90°. The voltage $E_{15}$ is applied to the winding 14 of the fan motor, as explained above, and the current through the winding 14, designated by the dotted vector $I_{14}$ in Fig. 4, lags the voltage $E_{15}$. The current through the winding 13 of the fan motor bears the same phase relationship to the applied voltage $E_a$ as under the previous conditions and this current is still designated by the solid line vector $I_{13}$. It can be seen that the current $I_{13}$ lags the current $I_{14}$ (dotted line) under the conditions shown in Fig. 3 by some angle between 90° and 180°, and the fan motor, therefore, rotates in a direction opposite to its direction of rotation under the conditions of Fig. 2 wherein the current $I_{13}$ leads the current $I_{14}$ (solid line). The value of the capacitance of the capacitor 24 is chosen so as to provide a sufficient angle of lead for current $I_{13}$ that this current leads $I_{14}$ by an angle between 90° and 180° under the conditions of Fig. 2 and lags $I_{14}$ by an angle between 90° and 180° under the conditions of Fig. 3. Thus, by the addition of a single capacitor element to a conventional circuit I have made possible automatic reversal of the fan motor each time the refrigerating unit starts and stops. This reversal, by changing the direction of air flow over the condenser, materially assists in minimizing collection of dust on the condenser.

In Figs. 2 and 3 the circuit relationships have been illustrated, respectively, under the condition where the refrigerating unit is idle and under the condition where the refrigerating unit is operating normally at full speed. An operating condition of relatively short duration which exists only during the time from the starting of the refrigerating unit motor until it comes up to full speed has not been illustrated because this condition, being of such short duration, is of minor significance. During this period while the refrigerating unit motor is coming up to speed, the relay 15a occupies a closed position wherein a circuit is completed from the line 19 through the contacts 15b to the winding 14 of the fan motor. During this short period, therefore, power is supplied from the line 19 directly to the winding 14 of the fan motor and from the line 19 through the capacitor 24 to the winding 13 of the fan motor. The current relationships in the windings 13 and 14 are, therefore, essentially the same as those under the condition illustrated in Fig. 2 wherein the refrigerating unit motor is idle. Therefore, one reversal of the fan motor takes place after the refrigerator unit motor has come up to speed and the relay 15a has dropped out and the other reversal of the fan motor takes place when the refrigerating unit motor is de-energized and stops.

While I have shown and described a specific embodiment of my invention I do not desire my invention to be limited to the particular form shown and described, and I intend by the appended claims to cover all modifications within the spirit and scope of my invention.

What I claim as new and desire to secure by Letters Patent of the United States is:

1. In combination, a single phase induction motor having a running winding and a split phase starting winding and a polyphase motor having first and second phase windings, means for connecting said first winding in series with said running and starting windings across the terminals of a source of alternating current, means including a capacitive reactance element in series with said second winding for connecting said second winding across the terminals of the source whereby said polyphase motor is energized to run in a predetermined direction, means including a first switch for connecting the common terminals of said running and starting windings to the terminal of the source common to said first and second windings, and means including a second switch for connecting the common terminals of said first winding and said starting winding to the other terminal of the source whereby on closing both said switches said induction motor is started and upon opening of said second switch said induction motor continues to run and said first winding is energized by current induced in said starting winding and effects a reversal of said polyphase motor and upon opening of both of said switches said polyphase motor returns to its first direction of rotation.

2. In a refrigerating apparatus including a condenser, an evaporator, a fan for cooling the condenser, a refrigerating unit having an intermittently operating single phase induction motor having a running winding and a split phase starting winding, and a continuously operating polyphase motor having first and second phase windings for driving the fan, an electrical circuit arrangement for effecting periodic reversal of said polyphase motor to reverse air circulation over said condenser, said arrangement including means for connecting said first winding in series with said running and starting windings across the terminals of a source of alternating current, means including a capacitive reactance element in series with said second winding for connecting said second winding across the terminals of the source whereby said polyphase motor is energized to run in a predetermined direction, means including a first switch for connecting the common terminals for said running and starting windings to the terminal of the source common to said first and said second windings, and means including a second switch for connecting the common terminals of said first winding and said starting winding to the other terminal of the source whereby on closing both of said switches said induction motor is started and upon opening of said second switch said induction motor continues to run and said first winding is energized by said current induced in said starting winding and effects reversal of said polyphase motor to effect reversal of air circulation over said condenser, the opening of both of said switches stopping said induction motor and simultaneously effecting reversal of said polyphase motor to again reverse the direction of air circulation over said condenser.

ERNEST F. SHELL.

No references cited.